(12) United States Patent
Kraft et al.

(10) Patent No.: US 9,164,785 B2
(45) Date of Patent: Oct. 20, 2015

(54) PREDICTING PERFORMANCE OF A CONSOLIDATED VIRTUALIZED COMPUTING ENVIRONMENT

(75) Inventors: Stephan Kraft, Belfast (GB); Diwakar Krishnamurthy, Calgary (CA); Giuliano Casale, Pavia (IT)

(73) Assignee: SAP SE, Walldorf (DE)

( * ) Notice: Subject to any disclaimer, the term of this patent is extended or adjusted under 35 U.S.C. 154(b) by 460 days.

(21) Appl. No.: 13/418,879

(22) Filed: Mar. 13, 2012

(65) Prior Publication Data

US 2012/0239376 A1   Sep. 20, 2012

Related U.S. Application Data

(60) Provisional application No. 61/452,414, filed on Mar. 14, 2011.

(51) Int. Cl.
| | | |
|---|---|---|
| *G06F 9/45* | (2006.01) | |
| *G06F 9/455* | (2006.01) | |
| *G06F 11/30* | (2006.01) | |
| *G06F 11/34* | (2006.01) | |

(52) U.S. Cl.
CPC .......... *G06F 9/45533* (2013.01); *G06F 11/301* (2013.01); *G06F 11/3419* (2013.01); *G06F 11/3447* (2013.01); *G06F 11/3476* (2013.01); *G06F 2201/815* (2013.01)

(58) Field of Classification Search
CPC ... G06F 9/50; G06F 11/3419; G06F 11/3447; G06F 11/008; G06F 11/3461; G06F 9/44505; G06F 13/1626; G06F 3/0659; G06F 9/5077; G06F 11/3409; G06F 11/3485; G06Q 10/067; G06Q 10/06
See application file for complete search history.

(56) References Cited

U.S. PATENT DOCUMENTS

| | | | | |
|---|---|---|---|---|
| 6,615,253 | B1 * | 9/2003 | Bowman-Amuah | 709/219 |
| 6,760,774 | B1 * | 7/2004 | Soumiya et al. | 709/233 |
| 7,373,451 | B2 * | 5/2008 | Lam et al. | 711/6 |
| 8,219,359 | B2 * | 7/2012 | Baba | 702/186 |
| 2010/0162257 | A1 * | 6/2010 | Hiltunen et al. | 718/104 |
| 2010/0268816 | A1 * | 10/2010 | Tarui et al. | 709/224 |

OTHER PUBLICATIONS

Aaron Carroll ("Linux Block I/O Scheduling", University of New South Welsh, Dec. 2007, pp. 1-12).*

(Continued)

*Primary Examiner* — Omar Fernandez Rivas
*Assistant Examiner* — Iftekhar Khan
(74) *Attorney, Agent, or Firm* — Fish & Richardson P.C.

(57) ABSTRACT

Implementations of the present disclosure provide computer-implemented methods for predicting a performance of a consolidated virtualized computing environment. Methods include processing benchmark workloads using a plurality of virtual machines to generate a plurality of traces, each trace including data corresponding to requests issued by a respective virtual machine operating in an isolated environment, storing the plurality of traces in one or more trace repositories, each trace repository provided as a computer-readable storage medium, selecting a trace from the plurality of traces stored in the one or more trace repositories, parameterizing a queuing model based on the trace, the queuing model representing request queuing in the consolidated virtualized computing environment, and processing the queuing model using one or more processors to generate one or more response time estimates for the consolidated virtualized computing environment.

14 Claims, 5 Drawing Sheets

(56) References Cited

OTHER PUBLICATIONS

Seelam et al. (Virtual I/O Scheduler: A Scheduler of Schedulers for Performance Virtualization, VEE'07, Jun. 13-15, 2007, pp. 105-115).*

Ardagna et al. (Black-box Performance Models for Virtualized Web Service Applications, WOSP/SIPEW'10, Jan. 28-30, 2010, pp. 153-163).*

Calzarossa et al. (A Workload Model Representative of Static and Dynamic Characteristics, Springer-Verlag, 1986, pp. 255-266).*

Seelam et al.("Virtual I/O Scheduler: A Scheduler of Schedulers for Performance Virtualization", ACM, 2007, pp. 105-115).*

Mengzhi Wang et al., "Storage Device Performance Prediction with CART Models," Proceedings of the 12th Annual Meeting of the IEEE/ACM International Symposium on Modeling, Analysis, and Simulation of Computer and Telecommunication Systems, MASCOTS, Oct. 2004, pp. 588-595.

Stephan Kraft et al., "IO Performance Prediction in Consolidated Virtualized Environments," Proceeding of the Second WOSP/SIPEW International Conference on Performance Engineering, ICPE 2011, Mar. 2011, pp. 295-306.

Linux, blktrace(8)—Linux man page, 2006, retrieved from http://linux.die.net/man/8/blktrace, 4 pages.

SourceForge.net, Flexible Filesystem Benchmark (FFSB), FFSB-v6.0-rc2, Jun. 2011, retrieved from http://sourceforge.net/projects/ffsb, 2 pages.

Openfiler, 2012, retrieved Oct. 31, 2012 from http://www.openfiler.com, 2 pages.

Debian, Package: postmark 1.51-7., 2012, retrieved on Oct. 31, 2012 from http://packages.debian.org/sid/postmark, 3 pages.

Don Domingo, "Whitepapers 1.0—Red Hat Enterprise Linux 5 IO Turning Guide," Red Hat Inc., Sep. 2008, 12 pages.

Vmware, "Storage Queues and Performance," Jul. 2008, retrieved from http://communities.vmware.com/docs/DOC-6490, 3 pages.

Vmware, 2012, retrieved on Oct. 31, 2012, from http://www.vmware.com, 1 page.

Irfan Ahmad, "Easy and Efficient Disk I/O Workload Characterization in VMware ESX Server," Proceedings of the 2007 IEEE International Symposium on Workload Characterization, IISWC, Sep. 2007 pp. 149-158.

Irfan Ahmad et al., "An Analysis of Disk Performance in VMware ESX Server Virtual Machines," Proceedings of the Sixth Annual Workshop on Workload Characterization, IEEE Computer Society Oct. 2003, pp. 65-76.

Jens Axboe, "Linux Block IO—present and future," Proceedings of the Linux Symposium, vol. One, Jul. 2004, pp. 51-61.

Forest Baskett et al., "Open, Closed, and Mixed Networks of Queues with Different Classes of Customers," Journal of the Association for Computing Machinery, vol. 22, No. 2, Apr. 1975, pp. 248-260.

Fabr'icio Benevenuto et al., "Performance Models for Virtualized Applications," Proceedings of the International Symposium on Parallel and Distributed Processing and Applications, ISPA, Dec. 2006, Lecture Notes in Computer Science 4331, pp. 427-439.

Mohamed N. Bennani et al., "Resource Allocation for Autonomic Data Centers Using Analytic Performance Models," Proceedings of the 2005 IEEE International Conference on Autonomic Computing, ICAC, Jun. 2005, pp. 229-240.

David Boutcher et al., Does Virtualization Make Disk Scheduling Passé?, ACM SIGOPS Operating Systems Review, vol. 44, Issue 1, Jan. 2010, pp. 20-24.

A. D. Brunelle, "blktrace User Guide," Feb. 2007, 18 pages.

Giuliano Casale et al., "Bound Analysis of Closed Queueing Networks with Workload Burstiness," Proceedings of the International Conference on Measurement and Modeling of Computer Systems, SIGMETRICS'08, Jun. 2008, pp. 13-24.

G. Casale et al., "KPC-Toolbox: Simple Yet Effective Trace Fitting Using Markovian Arrival Processes," In Proceedings of the 5th Conference on Quantitative Evaluation of Systems (QEST), pp. 83-92, Sep. 2008.

Abhishek Chandra et al., "Dynamic Resource Allocation for Shared Data Centers Using Online Measurements," Proceedings of the 11th International Conference on Quality of Service, IWQoS'03, Jun. 2003, pp. 381-398.

Alan Demers et al., "Analysis and Simulation of a Fair Queueing Algorithm," Proceedings of the ACM Symposium on Communications Architectures & Protocols, SIGCOMM '89, Sep. 1989, pp. 1-12.

Pawan Goyal et al., "Start-time Fair Queueing: A Scheduling Algorithm for Integrated Services Packet Switching Networks," Proceedings of the ACM Special Interest Group on Data Communication, SIGCOMM'96, Aug. 1996, pp. 157-168.

Ajay Gulati et al., "PARDA: Proportional Allocation of Resources for Distributed Storage Access," Proceedings of the $7^{th}$ USENIX Conference on File and Storage Technologies, FAST'09, Feb. 2009, pp. 85-98.

Ajay Gulati et al., "Storage Workload Characterization and Consolidation in Virtualized Environments," Proceedings of the Second International Workshop on Virtualization Performance: Analysis, Characterization, and Tools, VPACT'09, Apr. 2009, 10 pages.

Wei Jin et al., "Interposed Proportional Sharing for a Storage Service Utility," Proceedings of the Joint International Conference on Measurement and Modeling of Computer Systems, SIGMETRICS'04/Performance '04, *ACM SIGMETRICS Performance Evaluation Review*, vol. 32, Issue 1, May 2004, pp. 37-48.

Gueyoung Jung et al., "Generating Adaptation Policies for Multi-tier Applications in Consolidated Server Environments," Proceedings of the International Conference on Autonomic Computing, ICAC'08, Jun. 2008, pp. 23-32.

Younggyun Koh et al., "An Analysis of Performance Interference Effects in Virtual Environments," Proceedings of the IEEE International Symposium on Performance Analysis of Systems & Software, ISPASS'07, Apr. 2007, pp. 200-209.

Sajib Kundu et al., "Application Performance Modeling in a Virtualized Environment," Proceedings of the 2010 International Conference for High Performance Computing, Networking, Storage and Analysis, SC'10, Nov. 2010, pp. 1-10.

Edward D. Lazowska, et al., "Quantitative System Performance: Computer System Analysis Using Queueing Network Models," Prentice-Hall, 1984, 428 pages.

Ningfang Mi et al., "Performance impacts of autocorrelated flows in multi-tiered systems," *Performance Evaluation*, vol. 64, Issue 9-12, Oct. 2007, pp. 1082-1101.

Pradeep Padala et al., "Performance Evaluation of Virtualization Technologies for Server Consolidation," Technical Report HPL-2007-59, HP Laboratories Palo Alto, Apr. 2007, 15 pages.

\* cited by examiner

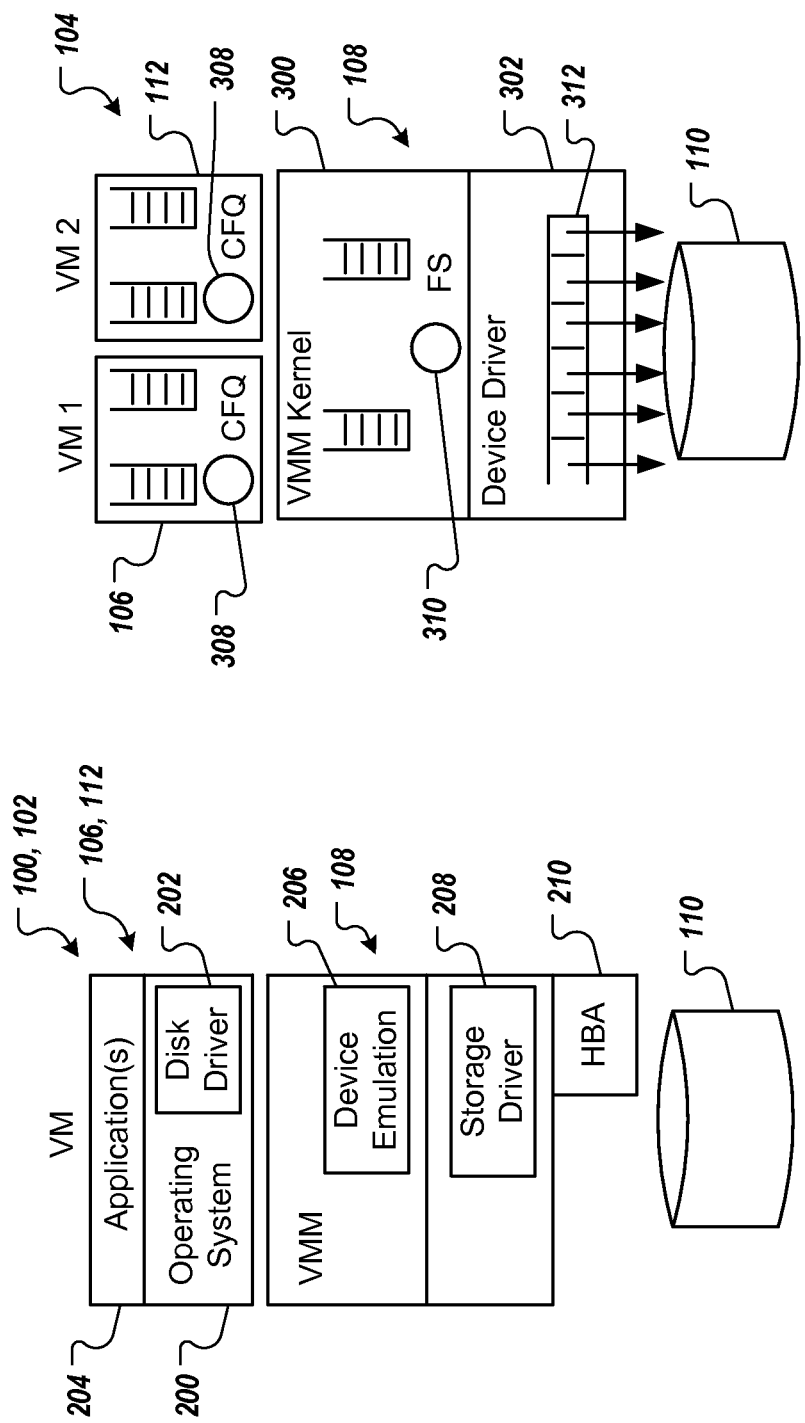

PREDICTING PERFORMANCE OF A CONSOLIDATED VIRTUALIZED COMPUTING ENVIRONMENT

CROSS-REFERENCE TO RELATED APPLICATIONS

This application claims the benefit of U.S. Prov. App. No. 61/452,414, filed Mar. 14, 2011, the disclosures of which is expressly incorporated herein by reference in the entirety.

BACKGROUND

The performance of input/output (I/O) bound applications is frequently dominated by the time required by the operating system to schedule read and write operations and by the response times of the storage devices in completing such operations. Changes in workload, as well as in the software and hardware environments, can affect the latency of disk I/O requests. Consequently, it is useful to define performance models to anticipate the effects of a change. This can be especially important in virtualized data centers, where the concurrent shared use of a storage device by several Virtual Machines (VMs) managed by a Virtual Machine Monitor (VMM) can lead to significant performance degradation.

In such systems, estimates of I/O contention for a given VM placement configuration can aid management and consolidation decisions. However, modeling the performance of disk requests can be challenging due to the joint interaction of the I/O flows issued by several VMs and because of the complexity of caching mechanisms, scheduling algorithms, device drivers, and communication protocols employed by both the VMs and the VMM.

SUMMARY

Implementations of the present disclosure provide computer-implemented methods for predicting a performance of a consolidated virtualized computing environment. Methods include processing benchmark workloads using a plurality of virtual machines to generate a plurality of traces, each trace including data corresponding to requests issued by a respective virtual machine operating in an isolated environment, storing the plurality of traces in one or more trace repositories, each trace repository provided as a computer-readable storage medium, selecting a trace from the plurality of traces stored in the one or more trace repositories, parameterizing a queuing model based on the trace, the queuing model representing request queuing in the consolidated virtualized computing environment, and processing the queuing model using one or more processors to generate one or more response time estimates for the consolidated virtualized computing environment.

In some implementations, a first isolated environment includes a first virtual machine and a virtual machine monitor (VMM), a second isolated environment includes a second virtual machine and the VMM, and the consolidated virtualized computing environment includes the first virtual machine, the second virtual machine and the VMM.

In some implementations, the plurality of traces includes request arrival traces, each request arrival trace being associated with a respective isolated environment.

In some implementations, the queuing model includes a merge value parameter that approximates a number of merged requests. In some examples, the merge value parameter is determined based on the trace. In some examples, parameterizing the queuing model includes executing an iterative search to estimate the merge value parameter. In some examples, executing the iterative search includes: determining a plurality of expected mean queue lengths and a plurality of effective mean queue lengths; determining a merge error based on an expected mean queue length of the plurality of expected mean queue lengths, an effective mean queue length of the plurality of effective mean queue lengths, and an estimated merge value parameter; and determining that the merge error is less than a threshold merge error and, in response, selecting the estimated merge value parameter as the merge value parameter. In some examples, the effective mean queue length is determined based on the estimated merge value parameter.

In some implementations, the queuing model is provided as a multiclass open queuing model that distinguishes requests submitted from individual virtual machines in separate classes.

In some implementations, the queuing model operates using start-time fair queuing (SFQ) scheduling.

In some implementations, each trace is generated based on a completely fair queuing (CFQ) scheduler of the respective virtual machine, the CHQ scheduler having internal queues to manage input and output (I/O) requests.

In some implementations, the consolidated virtualized computing environment includes two or more virtual machines operating on a virtualized server.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes a computer system that receives and processes service requests, one or more processors, and a computer-readable storage medium coupled to the one or more processors and having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 2 depicts a block diagram of an example isolated virtual machine (VM) environment.

FIG. 3 depicts a block diagram of an example consolidated VM environment.

Like reference symbols in the various drawings indicate like elements.

DETAILED DESCRIPTION

Implementations of the present disclosure provide systems and methods for predicting the performance degradation of disk request response times due to storage device contention in consolidated virtualized environments. In some implementations, such methods include generating a queuing model representing a consolidated environment. The queuing model may evaluate a queuing network with fair share scheduling using trace-driven simulation techniques. Queuing model parameters can be determined from measurements obtained inside Virtual Machines (VMs) from a system where a single VM accesses a remote storage device. Traces can be generated based on the measurements and the traces can be used to parameterize the queuing model. The parameterized queuing model may be used to predict the effect of storage contention when multiple VMs are consolidated on the same virtualized server. In some implementations, parameter estimation is provided and includes a search technique for estimating splitting and merging of logical blocks at the Virtual Machine Monitor (VMM) level in the case of multiple competing VMs in the consolidated environment.

Figure 1:
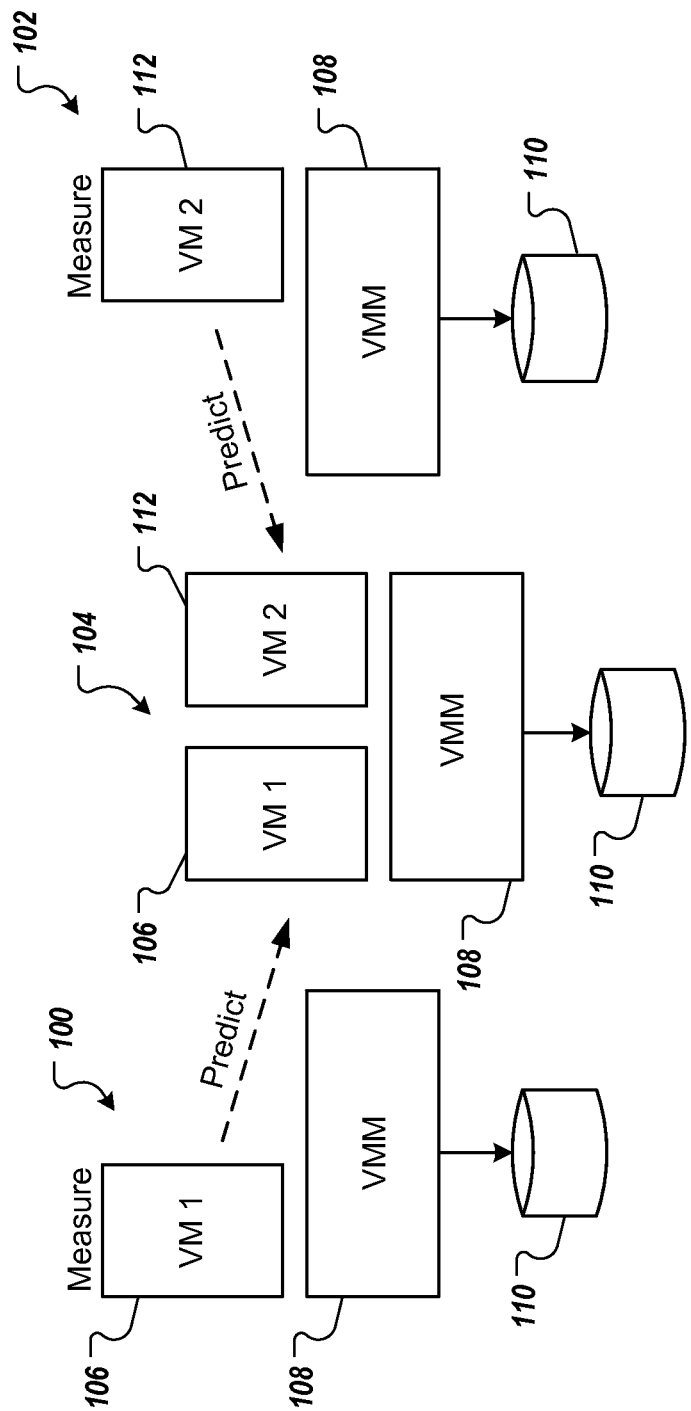
FIG. 1 depicts a block diagram summarizing methodologies in accordance with implementations of the present disclosure.

FIG. 1 depicts a block diagram summarizing methodologies in accordance with implementations of the present disclosure. An isolated environment 100, an isolated environment 102, and a consolidated environment 104 are depicted. The isolated environment 100 includes a VM 106, a VMM 108 and a storage device 110 (e.g., a computer-readable and/or -writable storage medium). The isolated environment 102 includes a VM 112, the VMM 108 and the storage device 110. The consolidated environment 104 includes the VM 106, the VM 112, the VMM 108 and the storage device 110. In the respective isolated environments 100, 102, the VMs 106, 112 execute one or more applications that issue read/write (I/O) requests to the VMM 108 to retrieve data from, or write data to the storage device 110. In the consolidated environment, the VMs 106, 112 each execute one or more applications that issue I/O requests to the VMM 108 to retrieve data from, or write data to the storage device 110. In the consolidated environment, the VMM 108 coordinates the competing I/O requests of the respective VMs 106, 112. In some implementations, the VMM 108 includes a device emulator for implementing virtualized hardware devices required by the VMs 106, 112. For example, applications running inside the VMs 106, 112 may interact with the virtualized devices emulated by the VMM 108 just as it would with physical native hardware.

FIG. 2 depicts a block diagram of an example isolated environment. The example isolated environment of FIG. 2 can correspond to the isolated environments 100, 102 of FIG. 1. The isolated environment 100, 102 includes a VM 106, 112, the VMM 108 and the storage device 110. The VM 106, 112 includes an operating system 200 having a disk driver 202 and executes one or more applications 204. The VMM 108 includes a device emulation module 206 and a storage driver 208. In some examples, the VMM 108 provides the VM 106, 112 with a virtualized interface to the underlying storage device 110 by means of the device emulation module. Interaction between the VMM 108 and the storage device 110 is governed by the disk driver 202. The VMM 108 communicates with the storage device 110 using a host bus adapter (HBA) 210.

Execution of the one or more applications can result in disk I/O requests issued from the VM 106, 112. Each I/O request may include one or multiple contiguous logical blocks for either reads or writes. Once an application 208 running inside the VM submits a request, the request can be provided to the disk driver 202 of the operating system 200. The disk driver 202 can process the request and forward it to the VMM 108. At the VMM 108, the request can be held to undergo further optimization operations (e.g., splitting and/or merging) before being issued to the storage device 110 via the storage driver 208 and the HBA 210.

FIG. 3 depicts a block diagram of an example consolidated VM environment. The example consolidated environment of FIG. 3 can correspond to the consolidated environment 104 of FIG. 1. The consolidated environment 104 includes the VMs 106, 112, the VMM 108 and the storage device 110. In the block diagram of FIG. 3, the queues of the storage subsystem present in the VM 106, 112, as well as a the VMM kernel 300, and a device driver 302 of the VMM 108 are illustrated. Contention for access to the storage device 110 between the VMs 106, 112 is managed by the VMM 108. In some implementations, the VMs 106, 112 can each be configured to use a completely fair queuing (CFQ) scheduler having internal queues to maintain and keep I/O requests. In some implementations, the VMM includes two sets of queues, VMM kernel queues and a device driver queue. The VMM kernel queues correspond to pending requests per VM for each target storage device. In some implementations, the VMM kernel queues can be controlled using a fair share (FS) scheduler.

As discussed in further detail herein, each of the VMs 106, 112 operating in the isolated environments 100, 102 are monitored during execution of benchmark workloads and respective traces are generated. For example, in some implementations, monitoring VMs may include collecting traces of arrival times and/or determining estimated service times for I/O requests for each VM 106, 112. A queuing model corresponding to the consolidated environment 104 is generated. The queuing model is parameterized based on the traces. The queuing model is used to estimate response time performance for handling I/O requests from the multiple VMs 106, 112 in the consolidated environment.

In some implementations, a plurality of traces are generated. Each trace corresponds to an isolated environment (e.g., isolated environments 100, 102) and is stored in a trace repository. Each trace can include one or more of: relative timestamps for each request issue event and completion event, a flag that indicates whether a request was a read or write request, the logical block address (LBA) pertaining to the request, and the number of blocks accessed. Issue events may specify that a request that has previously resided in the disk I/O schedule queue of the VM operating system has been sent to the driver. Completion events may indicate that a previously issued requested has been completed. From this information, per request response times can be calculated as the time difference between completion and issue events in the trace. Such information may also allow for computation of per request arrival times at the VMM. Traces may further include the block size of each request in order to capture request splitting and merging operations at the VMM kernel level. For example, a VMM may split requests above a certain block size threshold and/or merge several requests together to leverage spatial locality, as discussed below. In some implementations, traces are collected inside VMs. For example, a block layer I/O tracing mechanism can be used.

VM monitoring tools enable the recordation of traces of disk request issue and completion events, as they are recording from the VM operating system kernel. In some implementations, it may be advantageous to collect such data at the VM operating system level (as compared to the VM application level) in order to confirm that the sorting and merging operations of the VM scheduler are reflected in the monitoring trace.

The methodologies represented by FIG. 1 further include predicting or forecasting the impact of consolidation on I/O performance. Forecasting I/O degradation of I/O performance may include utilizing the collected isolation scenario traces to parameterize a queuing model for a specified consolidation scenario. In some implementations, the queuing model corresponds to a particular queuing discipline used by the VMM. An example queuing discipline includes start-time fair queuing (SFQ) scheduling. In some implementations, one or more other queuing models alone, or in some form of combination may be used.

In some implementations, it may be advantageous to utilize an iterative algorithm for parameterization of the simulation model. The algorithm may employ an iterative search technique to estimate the performance impact of VMM level I/O optimizations (e.g., the splitting and merging of IO requests), as described in detail below.

Each of the first and second VMs may be configured to utilize a scheduler 308 (e.g., a completely fair queuing (CFQ) scheduler), having a selected number of internal queues (in some examples, the VM scheduler is provided having 64 internal queues) to maintain and keep disk I/O requests. The respective schedulers 308 of VMs 302 and 304 may at least partially optimize disk access for the file system of storage device 306 (e.g., an ext3 file system), which may be configured at a selected block size (e.g., a logical block size of 4 kB). VMM 308 may include two further sets of queues (which may be separate and distinct from the internal queues of the respective VMs), namely VMM kernel queues and a device driver queue. The VMM can maintain a queue of pending requests per VM for each target server storage device (e.g., a SCSI device), controlled with a scheduler 310 (e.g., a fair share (FS) scheduler). In some implementations, VMM 308 formats virtual disk files in the VM file system and performs splitting, merging and reordering processing on disk requests that are queued at the VMM. The VMM also maintains a device driver queue 312 for each server storage device 110. The device driver queue 312 may control the issue queue length (i.e., the number of pending requests the server can have at the storage device at a time). In some implementations, the issue queue length can be configured for each of the server storage devices. When multiple host servers issue requests to the same storage device 110, this parameter can be used to control resource utilization and fairness across hosts.

As previously described, in consolidated VM environments (such as VM environment 104) requests can be queued multiple times on their way through the layers of the storage subsystem. As such, latencies of requests may be affected by multiple queuing delays. Furthermore, requests may undergo optimizations such as splitting, merging, and reordering by schedulers managing the various queues. Such operations are used to optimize disk access patterns, e.g., by merging multiple requests for small amounts of contiguous blocks to fewer requests for large amounts of contiguous blocks. In virtualized environments, these operations can have a significant impact on disk request performance, as scheduling policies at VM and VMM level may impair each other.

Figure 4:
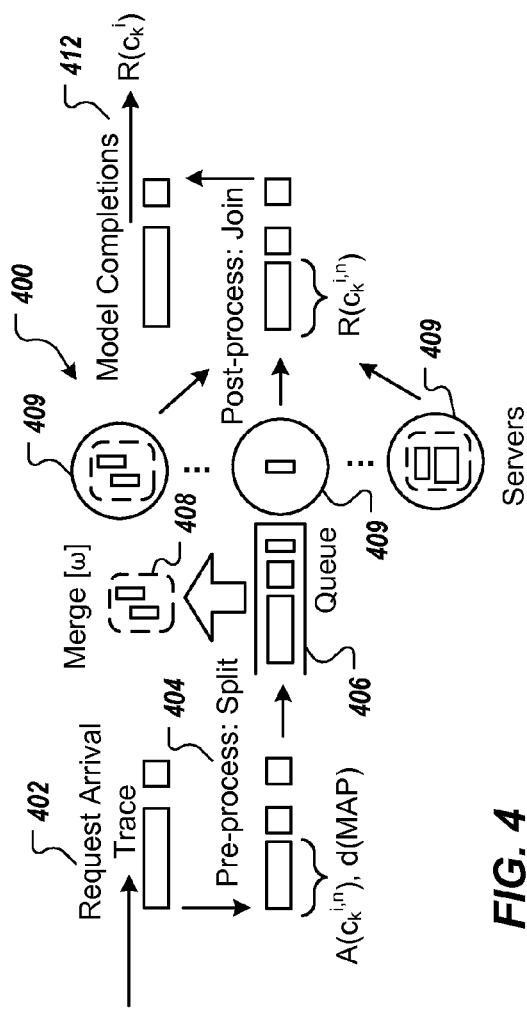
FIG. 4 depicts a high-level summary of an example methodology in accordance with implementations of the present disclosure.

FIG. 4 is a block diagram illustrating input and output parameters of an example simulation model 400 approximating a consolidated VM environment. Input parameters for simulation model 400 may include a request arrival trace 402 obtained from isolation benchmark experiments for each of the VMs considered in the consolidation scenario. The request arrival trace 402 can be selected from a plurality of traces stored in computer-readable memory. The simulation model 400 may account for VMM level request splitting behavior by performing one or more pre-processing operations 404 on the request arrival trace 402. As shown, pre-processed requests are arranged in an ordered queue 406 according to a selected scheduling discipline (e.g., SFQ scheduling). Request merging behavior of the system disk scheduler can be accounted for by bundling a configurable number of $\omega$ requests 408, and enabling them to share a storage device 409 (e.g., server). Queuing model 400 outputs response time estimates and can perform one or more post-processing operations 410 thereon. For example, the post-processing operations may include rejoining previously split requests. The resulting simulation output 412 may include a response time estimate for each scheduled request.

Arrival times (A) and services times (d) may be determined for each request ($c_k$) of class k from traces 402. As discussed above, arrival times can be computed using one or more pieces of information included in traces 402. Service times may be estimated based on trace data and one or more statistical inferences. For example, service times may be approximated from previous response time VM isolation measurements under the assumption that, in low utilization, queuing times will be negligible and response times are close to the actual service requirement. In order to utilize the approximated service times in higher utilization scenarios (e.g., VM consolidation scenarios), service times can be assumed to be non-load dependent. For the parameterization of the simulation model, the approximated service times are fit to a Markovian Arrival Process (MAP) that can be used to randomly sample a service time for each arrival. The MAP enables VM consolidation simulations to be run with random service times, where the randomness advantageously follows the same statistical properties (e.g., distribution, autocorrelation) observed in the isolation experiments. The model random service times are more realistic than deterministic service times, as in some implementations complex interactions of VMM system components may lead to high variability in I/O request service requirements.

Figure 5:
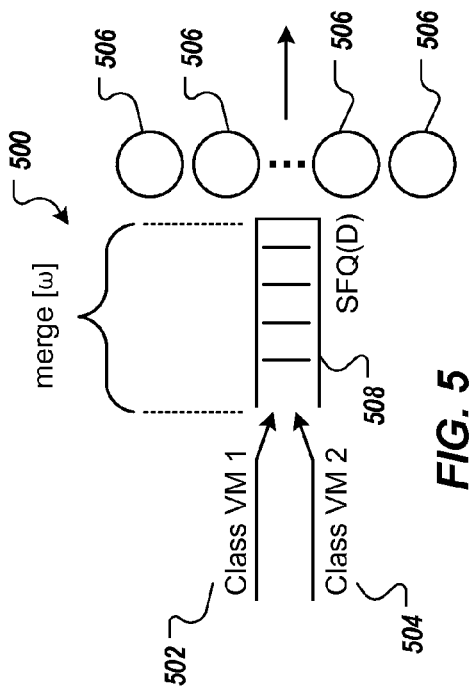
FIG. 5 depicts an example queuing model.

FIG. 5 depicts an example queuing model 500 suitable for use in the VM consolidation simulation techniques described herein. In some implementations, queuing model 500 is provided in the form of a multiclass open queuing model. As shown, requests submitted from individual VMs can be distinguished in separate classes (k) (e.g., classes 502 and 504). As discussed above, virtualization environments may provide a configurable parameter that controls the maximum VMM issue queue length to a target storage device. This aspect can be accounted for by modeling the issue queue length as a pool of parallel service stations 506 (i.e., servers). The configurable parameter can be maintained at any suitable value (e.g., an issue queue length of 32) and, consequently, the queuing model assumes the same number of servers.

Based on available VMM documentation, a SFQ disk scheduling discipline may be implemented to schedule requests to storage devices 506 (e.g., servers), resulting in an ordered queue 508 of requests. More specifically, and in some implementations, SFQ(D) (i.e., a parameterized variation of SFQ) scheduling may be utilized to model the reference consolidated system. In some cases, SFQ(D) scheduling can be superior to other scheduling techniques that do not consider concurrent service of requests as a resource. The depth parameter D dictates the number of concurrent requests in service. Thus, in some examples, it may be advantageous to set the parameter equal to the number storage devices 506 in the model.

Each request may be assigned a start tag (S) and a finish tag (F) by the scheduler upon arrival to the VMM. The tags represent the times at which each request should start and complete service according to a system notion of virtual time v(t). In some implementations, the tags may be computed based on the following respective relationships:

$$S(c_k^i) = \max\{v(A(c_k^i)), F(c_k^{j-1})\}, j \geq 1 \quad (1)$$

$$F(c_k^i) = S(c_k^i) + \frac{d_k^i}{\phi_k}, j \geq 1 \quad (2)$$

where $c_k^i$ is the $i^{th}$ request of class k, $A(c_k^i)$ is the arrival time of request $c_k^i$, $S(c_k^i)$ is the start tag of request $c_k^i$, $F(c_k^i)$ is the finish tag of request $c_k^i$, $F(c_k^0)=0$, $v(0)=0$, $d_k^i$ is the service time of request $c_k^i$, and $\phi_k \geq 0$ is the weight or share of class k, $\Sigma_{k=1}^{K} \phi_k = 1$.

In some examples, the scheduler issues a maximum of D requests to idle servers in increasing order of start tags. Subsequently, when one request is completed, the queued request with min(S) is selected and issued to an available server to maintain a concurrency level of D. Virtual time v(t) advances by assigning it the start tag of the last request issued on or before time t (i.e., the queued request with the lowest start tag at the time of the last issue).

As discussed above, requests may undergo one or more optimization processes such as splitting, merging, and reordering by schedulers managing the various queues at the VMM level. For example, request splitting operations of the VMM may be triggered when the block sizes of arriving requests exceed a pre-defined request size threshold. In order to account for such VMM request splitting behavior, one or more pre-processing operations may be performed on the model input parameters (e.g., request arrival trace 402). For example, the following pre-processing operation may be performed:

$$N_k^i = \left\lceil \frac{B(c_k^i)}{l_{max}} \right\rceil \quad (3)$$

$$A(c_k^{i,n}) = A(c_k^i) \quad (4)$$

$$B(c_k^{i,n}) = \begin{cases} l_{max} & n \in \{1 \ldots N_k^i\} \vee B(c_k^i) \bmod l_{max} = 0 \\ B(c_k^i) \bmod l_{max} & n = N_k^i \wedge B(c_k^i) \bmod l_{max} \neq 0 \end{cases} \quad (5)$$

where $N_k^i$, is the total amount of splitting operation for arrival $c_k^i$ determined from the ceiling function, mod finds the remainder of the division, and $n \in \{1 \ldots N_k^i\}$. Because splitting operations are performed by the VMM and are not visible to the VMs, previously split requests are rejoined once service is completed.

As discussed above, prediction results or request response times can be significantly improved if the model is enhanced with heuristics to account for the merging operations done by the VMM. Thus, in some implementations, the scheduler is allowed to merge queued requests. In some examples, a configurable amount of queued requests may be merged such that they remain separate entities, but share a server, (i.e., connection to the storage device). For example, a merge value parameter, denoted ω, may be passed to the simulator, which approximates the amount of merging operations observed in the real system. Merging values can range in [1,∞]. A merge value of 1 may be considered as a single job being issued per service station (i.e., no merging). Conversely, a large ω may indicate that several requests are merged together before being issued to the storage device.

In some implementations, the properties of the SFQ scheduler are maintained by merging requests in increasing number of start tags. In some implementations, only requests of the same class are merged. As a result, the prescribed merging implementation algorithm may abort in cases where the queued request with the minimum start tag is of a different class as the already merged requests. Once a merged job has received service and exits the queuing model, each of the merged requests may count as a separate completion. Because each of the requests sharing a service station has an individual service time, the aggregate service requirement of merged times can be approximated. In some implementations, a merging algorithm, denoted as Algorithm 1, can be as follows:

```
ω ← merge value
merged_jobs ← struct
while service station idle AND job queued do
    x ← get_int_value(ω)
    for i = 1 to x do
        job ← queued job with min start_tag
        if i == 1 then
            merged_jobs + job
        else
            if class job == class merged_jobs then
                merged_jobs ← merged_jobs + job
            else
                break
            end if
        end if
    end for
    schedule merged_jobs to idle service station
end while
```

In some cases, the merging operations inherent in the real system can be approximated without detailed knowledge of the VMM internals and further complication of the simulation model, by explicitly considering spatial locality of requests in the simulator. To estimate the merging value in this blackbox view of the VMM, an iterative search technique may be utilized. The search technique may dictate the mean number of requests in simulation experiments (i.e., the mean queue length), through the ω parameter and terminate once the mean queue length seen in simulation closely matches an inferred expected queue length.

The first step of merge value estimation may include inferring the expected mean queue length in the system for the consolidation scenario of under examination. The expected mean queue length for a consolidation scenario with K classes may be inferred based on the assumption that the mean number of requests in the system grows linearly when moving from isolation to consolidation:

$$N_{exp}^K = \sum_{i=1}^{K} N_{meas}^{iso} \quad (6)$$

where K is the total number of request classes considered in the simulation model, $N_{exp}^K$ is the expected mean queue length in simulation, and $N_{meas}^{iso}$ is a measurement of the mean queue length obtained in isolation benchmark experiments.

The expected queue length approximation may be used as an input parameter for an iterative search technique to estimate the merge value parameter for the simulation model. The iterative search can be further parameterized with a configurable initialization point and a maximum relative error value, $\Delta_{max}$, that serves as a search termination condition. Each search iteration may begin with a number of simulator runs that incorporate merging operations according to the current value of ω. Additionally, each simulator run can be parameterized with a random combination of inter-arrival time traces drawn from a trace repository (the trace repository may be created as a result of previous VM isolation benchmark experiments), as discussed in further detail herein, depending on the number and type of considered request classes k. At the end of each search iteration, the corrected mean queue length can be computed with:

$$N'_{sim} = \frac{N_{sim}}{\omega}, \omega \geq 1 \quad (7)$$

where $N_{sim}$ is the mean queue length over all simulation runs and $N'_{sim}$ represents the effective queue length after the merging transformation with ω.

The effective queue length in simulation can then be used as an input parameter for the function get_merge_error (see Algorithm 2 below), which may compute the relative error $\Delta_\omega$ produced by the current ω estimate according to an error function:

$$\Delta_\omega = \left| \frac{N'_{sim} - N_{exp}}{N_{exp}} \right| \quad (8)$$

where $N_{exp}$ is the inferred expected queue length (computed according to equation 4) from isolation experiments.

In some examples, the iterative search may terminate if the corrected queue length is considered accurate (e.g., within 5% of $N_{exp}$). In cases where the estimation error is outside of this range, the search direction and ω values may be controlled on the basis of a binary search. For example, ω=g ($N'_{sim}$) can be provided as the merge value used in simulation to obtain $N'_{sim}$. If $N'_{sim}$ is smaller than $N_{exp}$, ω may be decreased in order to increase the mean number of requests in simulation. In cases where previous iterations have produced $N'_{sim,old}$, such that $N'_{sim,old} > N_{exp} > N'_{sim}$, the merge value for the next iteration can be determined by:

$$\omega = g(N'_{sim}) - \frac{g(N_{sim})' - g(N_{sim,old})}{2} \quad (9)$$

which is half the distance between the ω values used to obtain $N'_{sim}$ and $N'_{sim,old}$ (it should be noted that the inverse of the above may apply for the opposite search direction). Conversely, in cases where no such $N'_{sim,old}$ exists, ω may be decreased by a configurable step parameter.

In some examples, the iterative estimation, denoted as Algorithm 2, proceeds as follows:

```
ω ← merge value initialization point
N_exp ← inferred expected queue length
Δ_max ← 0.05
flag ← 0
```

```
while flag < 1 do
    #run configurable amount of simulator iterations
    for i = 1 to max_simulator_iterations do
        for k = 1 to K do
            draw random arrival trace from repository
        end for
        simulate(ω)
    end for
    #search merge value ω
    N_sim       ← mean queue length over simulator iterations
    N'_sim      ← (N_sim/ω)
    Δ_ω ← get_merge_error (N'_sim)
    if Δ_ω ≤ Δ_max then
        flag ← 1
    else if N'_sim < N_exp then
        ω ← decrease
    else if N'_sim > N_exp then
        ω ← increase
    end if
end while
```

Because splitting operations performed by the VMM may not be visible to the VMs, previously split requests may require post-processing (i.e., rejoining) once they have completed service. As such, a post-processing operation may be performed on requests that leave the simulation model. Response times of joined requests may be computed as a mean of the sum of response times corresponding to the portions of a split request. For example, the following post-processing operation may be performed:

$$R(c_k^i) = \frac{1}{N_k^i} \sum_{n=1}^{N_k^i} R(c_k^{i,n}) \quad (10)$$

where $R(c_k^i)$ is the response time of request $c_k^i$.

As discussed above, the queuing model is parameterized with measured arrival time (A) traces, which are recorded in a series of benchmark experiments. Benchmark workloads are submitted from within VMs running in isolation, where only a single VM is running on the server (e.g., isolated environments 100, 102 of FIG. 1). For each VM (e.g., VM 106, 112 of FIG. 1) a trace repository is generated and includes data corresponding to multiple benchmark runs. In some implementations, traces are recorded with a blktrace tool, where every in-VM request issue is included as an arrival in the queuing model.

When predicting request response times for consolidation scenarios, an arrival trace is randomly chosen for each considered VM (e.g., VM 106, 112 of FIG. 1) from the respective trace repositories. The randomly selected arrival traces are run in the consolidation simulations. Parameterizing the queuing model with arrival traces measured in isolation experiments is valid, because the inter-arrival time distribution of disk requests to the VMM is not significantly impacted by workload consolidation. This indicates that, in the presence of contention delays, disk requests are queued at the VMM, rather than at the VMs. Queuing requests at the VMM is preferable, because queue depths at the VMM are larger than at the VMs, and the VMM can use system specific information to optimize disk access of queued requests. As discussed above, the queuing model outputs estimated response times for each request, where a response times of split requests are provided as the mean response time after post-processing joinder. More specifically, each request has an arrival time, as provided from the input trace, and the queuing model outputs a completion time. The response times are computed as difference between the completion time and arrival time for each request. That is, response times are calculated as the difference between request issue and request completion.

Figure 6:
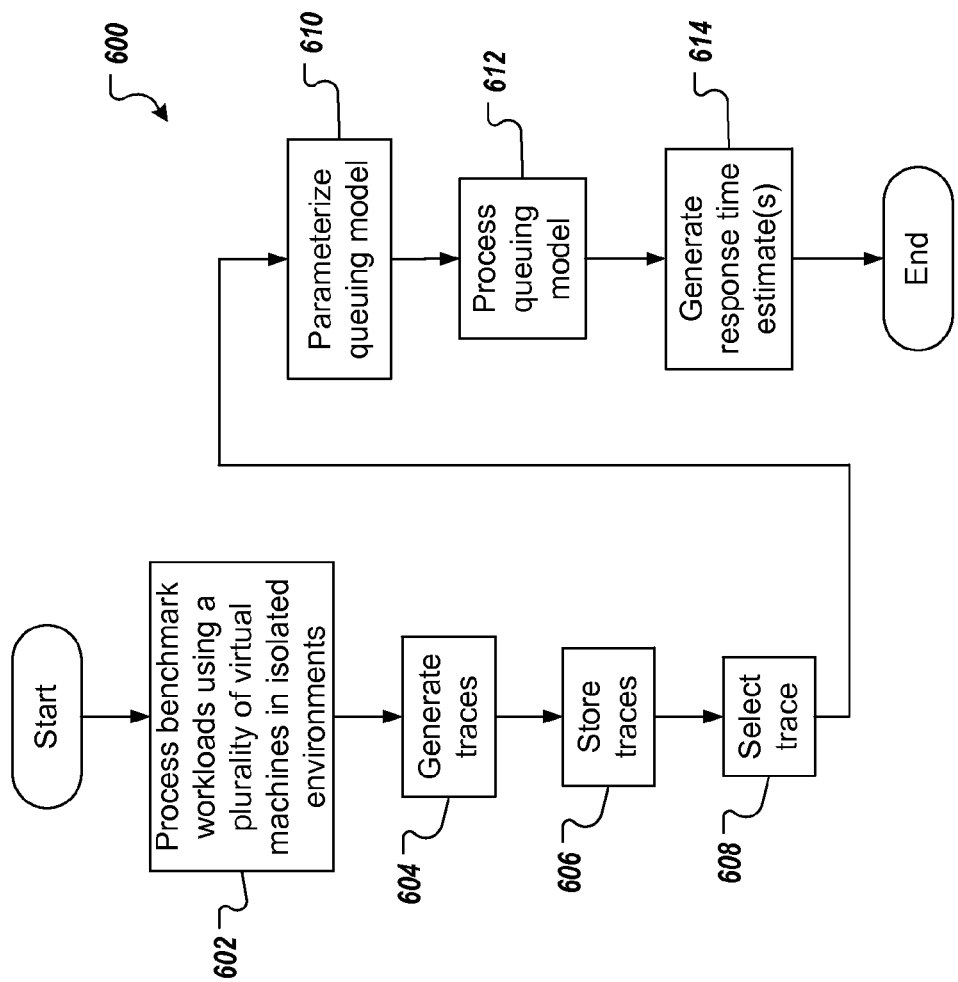
FIG. 6 depicts an example process that can be executed in accordance with the present disclosure.

FIG. 6 depicts an example process 600 that can be executed in accordance with the present disclosure. Benchmark workloads are processed using a plurality of VMs in respective isolated environments (602). For example, and with reference to FIG. 1, the VM 106 can process one or more benchmark workloads while operating in the isolated environment 100, and the VM 112 can process one or more benchmark workloads while operating in the isolated environment 102. Traces are generated (604). For example, one or more traces can be generated with each trace corresponding to a benchmark workload processed by the VM 106 while operating in the isolated environment 100. Further, one or more traces can be generated with each trace corresponding to a benchmark workload processed by the VM 112 while operating in the isolated environment 102. The traces are stored (606). For example, the traces can be stored in one or more trace repositories, each of the one or more trace repositories can be provided as a computer-readable/-writable storage medium.

A trace is selected from the one or more trace repositories (608). For example, a trace corresponding to corresponding to a benchmark workload processed by the VM 106 while operating in the isolated environment 100 can be selected. As another example, a trace corresponding to a benchmark workload processed by the VM 112 while operating in the isolated environment 102 can be selected. In some implementations, the trace can be randomly selected from the one or more trace repositories. A queuing model is parameterized based on the selected trace (610). The queuing model is processed (612) and one or more response time estimates are generated (614). Each of the one or more response time estimates reflects a performance of a corresponding VM within a consolidated virtual computing environment.

The techniques described herein enable parameterization of a simulation model based largely on data obtained inside VMs in isolation experiments. Advantageously, very little information from the VMM may be required, thereby effectively treating the VMM as a blackbox. Such techniques may also obviate the need to collect model training data for different VM consolidation scenarios. As a further advantage, the simulation model described can be enhanced with an iterative technique that estimates the impact of optimization operations performed by the VMM kernel disk scheduler, such as splitting and/or merging of requests.

Figure 7:
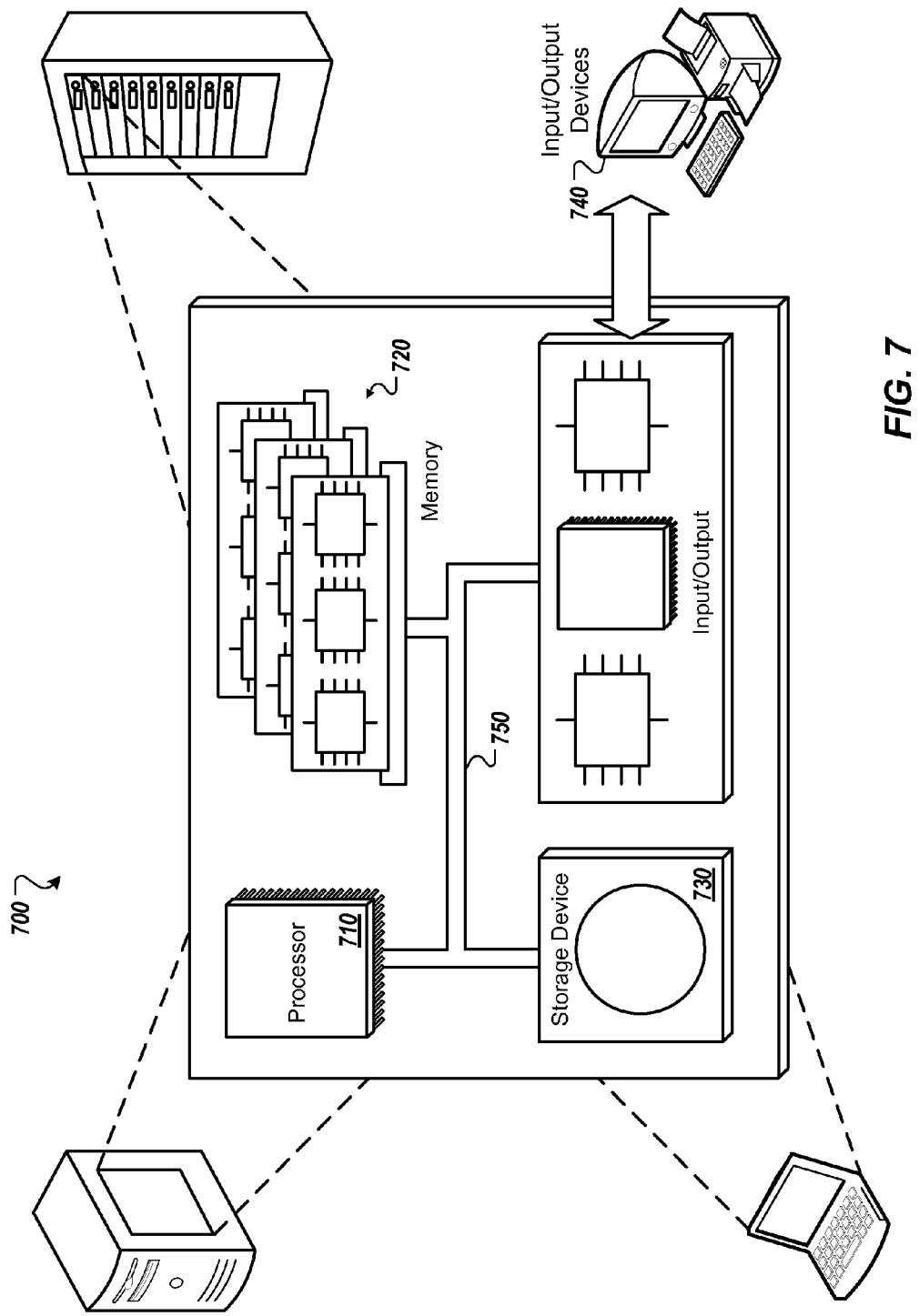
FIG. 7 is a schematic illustration of example computer systems that can be used to execute implementations of the present disclosure.

Referring now to FIG. 7, a schematic illustration of example hardware components 700 that can be used to execute implementations of the present disclosure is provided. The system 700 can be used for the operations described in association with the methods described herein. The system 700 includes a processor 710, a memory 720, a storage device 730, and an input/output device 740. Each of the components 710, 720, 730 and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of predicting a performance of a consolidated virtualized computing environment, comprising:
   generating, by one or more processors, a plurality of traces by processing benchmark workloads using a plurality of virtual machines, each trace being collected inside a respective virtual machine and comprising data corresponding to requests issued by the respective virtual machine operating in an isolated environment, the data comprising a block size of each request;
   storing, by one or more processors, the plurality of traces in one or more trace repositories, each trace repository provided as a computer-readable storage medium;
   selecting, by one or more processors, a trace from the plurality of traces stored in the one or more trace repositories;
   performing, by the one or more processors, one or more pre-processing operations on the trace, the one or more pre-processing operations comprising splitting at least one request comprising a respective block size that exceeds a threshold block size, a total amount of splitting the at least one request being determined from a ceiling function applied to a remainder of a division of the at least one request based on the threshold block size;
   parameterizing, by one or more processors, a queuing model based on the trace and the one or more pre-processing operations, the queuing model representing request queuing in the consolidated virtualized computing environment; and
   processing the queuing model using one or more processors to generate one or more response time estimates for the consolidated virtualized computing environment.

2. The method of claim 1, wherein a first isolated environment comprises a first virtual machine and a virtual machine monitor (VMM), a second isolated environment comprises a second virtual machine and the VMM, and the consolidated virtualized computing environment comprises the first virtual machine, the second virtual machine and the VMM.

3. The method of claim 1, wherein the plurality of traces comprise request arrival traces, each request arrival trace being associated with a respective isolated environment.

4. The method of claim 1, wherein the queuing model comprises a merge value parameter that approximates a number of merged requests.

5. The method of claim 4, wherein the merge value parameter is determined based on the trace.

6. The method of claim 4, wherein parameterizing the queuing model comprises executing an iterative search to estimate the merge value parameter.

7. The method of claim 6, wherein executing the iterative search comprises:
   determining a plurality of expected mean queue lengths and a plurality of effective mean queue lengths;
   determining a merge error based on an expected mean queue length of the plurality of expected mean queue lengths, an effective mean queue length of the plurality of effective mean queue lengths, and an estimated merge value parameter; and
   determining that the merge error is less than a threshold merge error and, in response, selecting the estimated merge value parameter as the merge value parameter.

8. The method of claim 7, wherein the effective mean queue length is determined based on the estimated merge value parameter.

9. The method of claim 1, wherein the queuing model is provided as a multiclass open queuing model that distinguishes requests submitted from individual virtual machines in separate classes.

10. The method of claim 1, wherein the queuing model operates using start-time fair queuing (SFQ) scheduling.

11. The method of claim 1, wherein each trace is generated based on a completely fair queuing (CFQ) scheduler of the respective virtual machine, the CFQ scheduler having internal queues to manage input and output (I/O) requests.

12. The method of claim 1, wherein the consolidated virtualized computing environment comprises two or more virtual machines operating on a virtualized server.

13. A non-transitory computer-readable storage medium coupled to one or more processors and having instructions stored thereon which, when executed by the one or more processors, cause the one or more processors to perform operations for improving keyword searches, the operations comprising:
   generating a plurality of traces by processing benchmark workloads using a plurality of virtual machines, each trace being collected inside a respective virtual machine and comprising data corresponding to requests issued by the respective virtual machine operating in an isolated environment, the data comprising a block size of each request;
   storing the plurality of traces in one or more trace repositories, each trace repository provided as a computer-readable storage medium;
   selecting a trace from the plurality of traces stored in the one or more trace repositories;
   performing one or more pre-processing operations on the trace, the one or more pre-processing operations comprising splitting at least one request comprising a respective block size that exceeds a threshold block size, a total amount of splitting the at least one request being determined from a ceiling function applied to a remainder of a division of the at least one request based on the threshold block size;
   parameterizing a queuing model based on the trace and the one or more pre-processing operations, the queuing model representing request queuing in a consolidated virtualized computing environment; and processing the queuing model using one or more processors to generate one or more response time estimates for the consolidated virtualized computing environment.

14. A system, comprising:
a computing device; and
a computer-readable storage device coupled to the computing device and having instructions stored thereon which, when executed by the computing device, cause the computing device to perform operations for improving keyword searches for enterprise services, the operations comprising:
generating a plurality of traces by processing benchmark workloads using a plurality of virtual machines, each trace being collected inside a respective virtual machine and comprising data corresponding to requests issued by the respective virtual machine operating in an isolated environment, the data comprising a block size of each request;
storing the plurality of traces in one or more trace repositories, each trace repository provided as a computer-readable storage medium;
selecting a trace from the plurality of traces stored in the one or more trace repositories;
performing one or more pre-processing operations on the trace, the one or more pre-processing operations comprising splitting at least one request comprising a respective block size that exceeds a threshold block size, a total amount of splitting the at least one request being determined from a ceiling function applied to a remainder of a division of the at least one request based on the threshold block size;
parameterizing a queuing model based on the trace and the one or more pre-processing operations, the queuing model representing request queuing in a consolidated virtualized computing environment; and
processing the queuing model using one or more processors to generate one or more response time estimates for the consolidated virtualized computing environment.

\* \* \* \* \*